United States Patent
Yoshikawa

(10) Patent No.: US 12,533,096 B2
(45) Date of Patent: Jan. 27, 2026

(54) DATA PROCESSING APPARATUS AND DATA PROCESSING METHOD

(71) Applicant: J. MORITA MFG. CORP., Kyoto (JP)

(72) Inventor: Hideki Yoshikawa, Kyoto (JP)

(73) Assignee: J. MORITA MFG. CORP., Kyoto (JP)

( * ) Notice: Subject to any disclaimer, the term of this patent is extended or adjusted under 35 U.S.C. 154(b) by 318 days.

(21) Appl. No.: 18/336,506

(22) Filed: Jun. 16, 2023

(65) Prior Publication Data

US 2023/0414186 A1 Dec. 28, 2023

(30) Foreign Application Priority Data

Jun. 22, 2022 (JP) ................................ 2022-100408

(51) Int. Cl.
*A61B 6/51* (2024.01)
*G06T 7/00* (2017.01)
(Continued)

(52) U.S. Cl.
CPC ............ *A61B 6/512* (2024.01); *G06T 7/0012* (2013.01); *G06T 7/11* (2017.01); *G06T 19/20* (2013.01);
(Continued)

(58) Field of Classification Search
CPC ... G06T 7/11; G06T 7/33; G06T 19/20; G06T 7/0012; G06T 2207/10081; G06T 2207/10028; G06T 2219/2004; G06T 2207/30036; G06T 2207/10116; G06T 7/00; G06T 17/00; G06T 11/005;
(Continued)

(56) References Cited

U.S. PATENT DOCUMENTS

| 2013/0310963 | A1 | 11/2013 | Davison |
| 2022/0110723 | A1 | 4/2022 | Raby et al. |
| 2023/0149128 | A1* | 5/2023 | Abraham ............. A61C 9/0046 382/131 |

FOREIGN PATENT DOCUMENTS

| JP | 2019-51323 A | 4/2019 |
| JP | 2019-208711 A | 12/2019 |

(Continued)

OTHER PUBLICATIONS

Extended European Search Report issued Nov. 16, 2023 in European Patent Application No. 23180102.8, citing references 15 and 24 therein, 13 pages.

(Continued)

*Primary Examiner* — Irakli Kiknadze
(74) *Attorney, Agent, or Firm* — Oblon, McClelland, Maier & Neustadt, L.L.P.

(57) ABSTRACT

A data processing apparatus includes: an input portion configured to receive IOS data and CT data as an input, the IOS data being obtained by performing scanning by an intra oral scanner and including coordinate data of a point group indicating a surface shape of a tooth row including an IOS crown and an IOS gingiva, the CT data being obtained by performing capturing by a CT imaging device and including volume data of a CT crown; and processing circuitry. The processing circuitry replaces, in the CT data, a crown part of a CT tooth included in the CT data with which a shape of the IOS crown matches, with the IOS crown included in the IOS data, and performs synthesis in such a way that the IOS gingiva is arranged near the IOS crown after replacement.

20 Claims, 19 Drawing Sheets

(51) Int. Cl.
*G06T 7/11* (2017.01)
*G06T 19/20* (2011.01)

(52) U.S. Cl.
CPC .............. *G06T 2207/10116* (2013.01); *G06T 2207/30036* (2013.01); *G06T 2219/2004* (2013.01)

(58) Field of Classification Search
CPC ......... G06T 15/00; G06T 7/0016; G06T 7/12; G06T 7/55; G06T 7/90; G06T 2200/04; G06T 2207/10024; G06T 2207/10101; G06T 2210/41; G06T 2211/456; G06T 11/60; G06T 19/006; G06T 17/20; G06T 17/205; G06T 2219/2016; G06T 2200/08; G06T 2207/10132; G06T 2207/10048; G06T 2207/20081; G06T 2207/20084; G06T 11/008; G06T 7/73; G06T 7/246; G06T 7/10; G06T 7/143; G06T 19/00; G06T 2207/20076; G06T 2207/10016; G06T 15/04; G06T 2219/2012; A61B 6/512; A61B 5/0066; A61B 5/0071; A61B 5/0088; A61B 1/24; A61B 6/032; A61B 6/14; A61B 6/51; A61B 5/4547; A61B 5/0035; A61B 5/682; A61B 5/4552; A61B 6/4417; A61B 2562/0247; A61B 2034/2055; A61B 6/547; A61B 6/468; A61B 6/461; A61B 6/4085; A61B 6/5294; A61B 5/055; A61B 8/08; A61B 6/5223; A61C 13/0004; A61C 9/0046; A61C 8/0089; A61C 5/77; A61C 13/34; A61C 1/084; A61C 19/04; A61C 9/0053; A61C 5/20; A61C 5/70; A61C 11/006; A61C 7/002; A61C 7/08; A61C 9/00; A61C 9/004; A61C 13/0013; A61C 13/08; A61C 13/082; A61C 13/0019; G06Q 50/04; G06F 30/20; G06F 30/23; G06F 30/17; G06F 2119/14; G06F 30/00; G06F 19/322; G06F 19/321; G16H 50/50; G16H 10/60; G16H 30/00; G16H 50/20; G16H 30/40; G16H 50/70; G16H 30/20; G06N 7/01; G06N 20/00; G06N 3/0475; G06N 3/0464; G06N 3/09; G06N 3/08; G06N 3/094; G06N 3/045; B33Y 50/00; B33Y 80/00; B33Y 10/00
USPC .............................................. 378/168, 38, 62
See application file for complete search history.

(56) References Cited

FOREIGN PATENT DOCUMENTS

JP        2022-516490 A     2/2022
WO    WO 2020/141366 A1    7/2020

OTHER PUBLICATIONS

Jang, T. et al., "Fully automatic integration of dental CBCT images and full-arch intraoral impressions with stitching error correction via individual tooth segmentation and identification," arxiv.org, Cornell University Library, Dec. 3, 2021, XP031113858, 10 pages.
Japanese Office Action issued Jun. 4, 2024 in Japanese Patent Application No. 2022-100408 (with unedited machine-generated English translation) citing documents 15 and 16 therein, 6 pages.

* cited by examiner

FIG.11
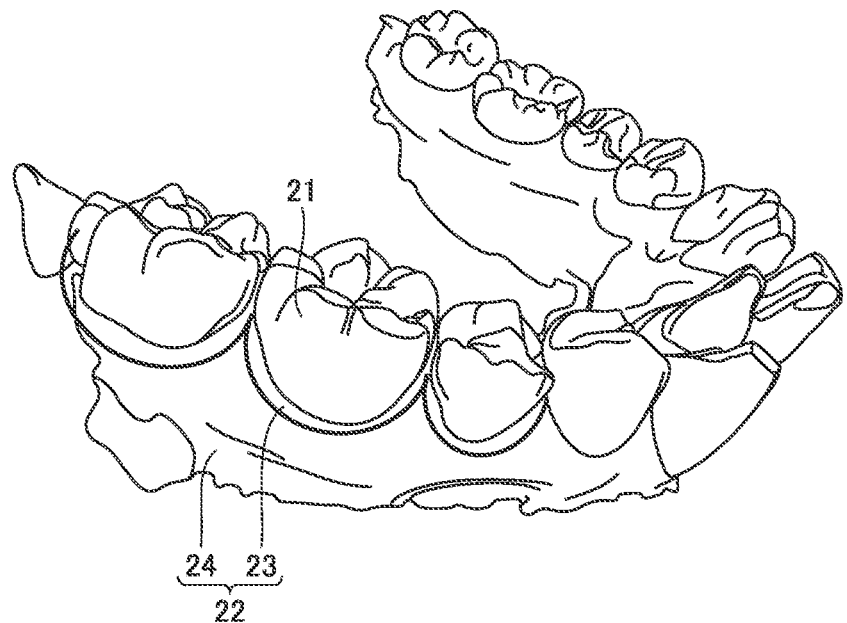
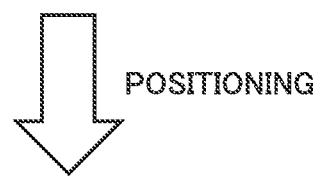
POSITIONING
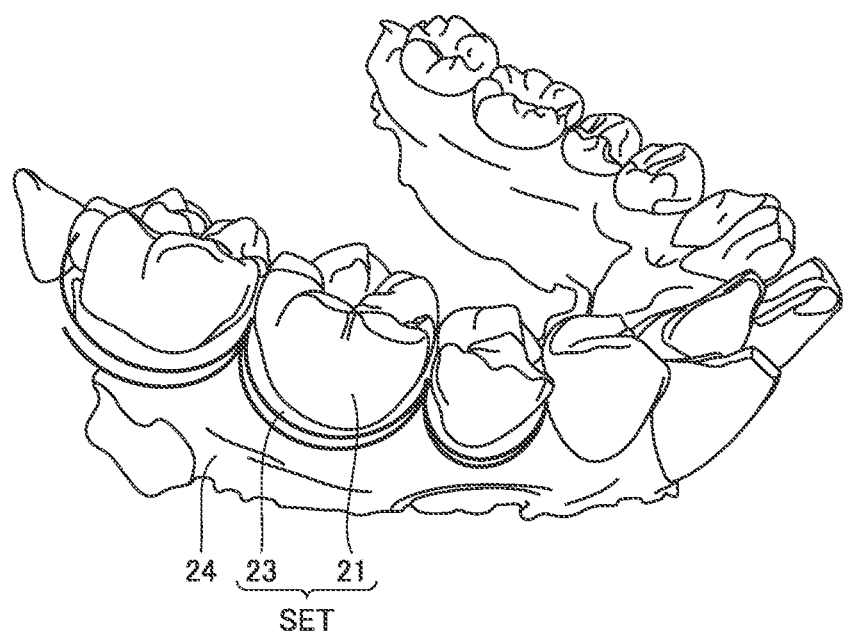

FIG.13
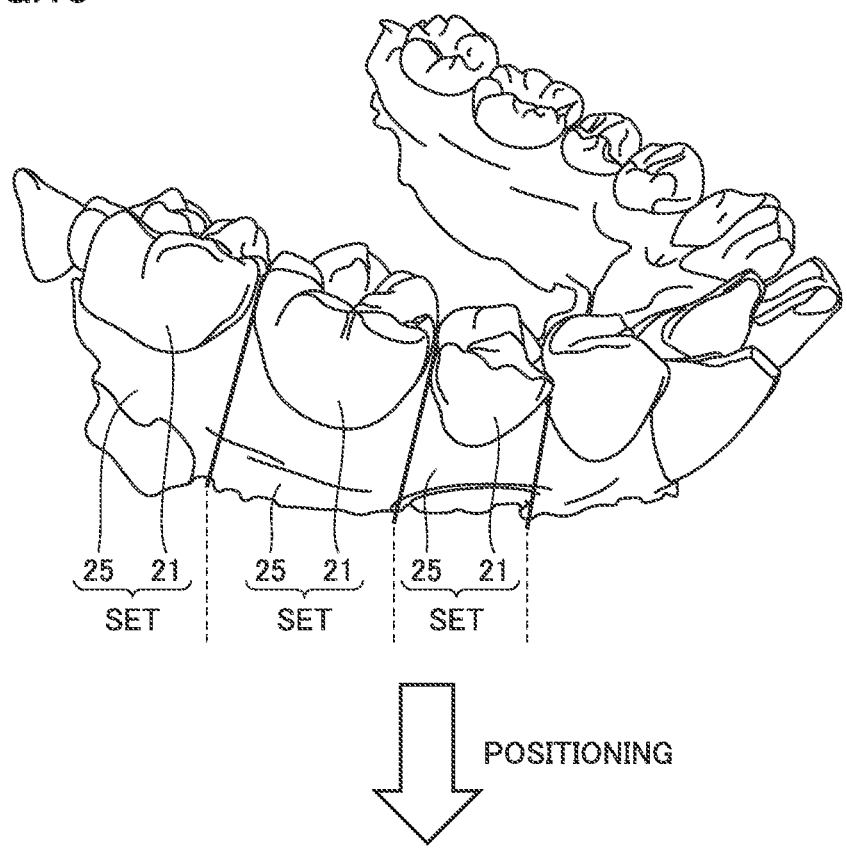
POSITIONING
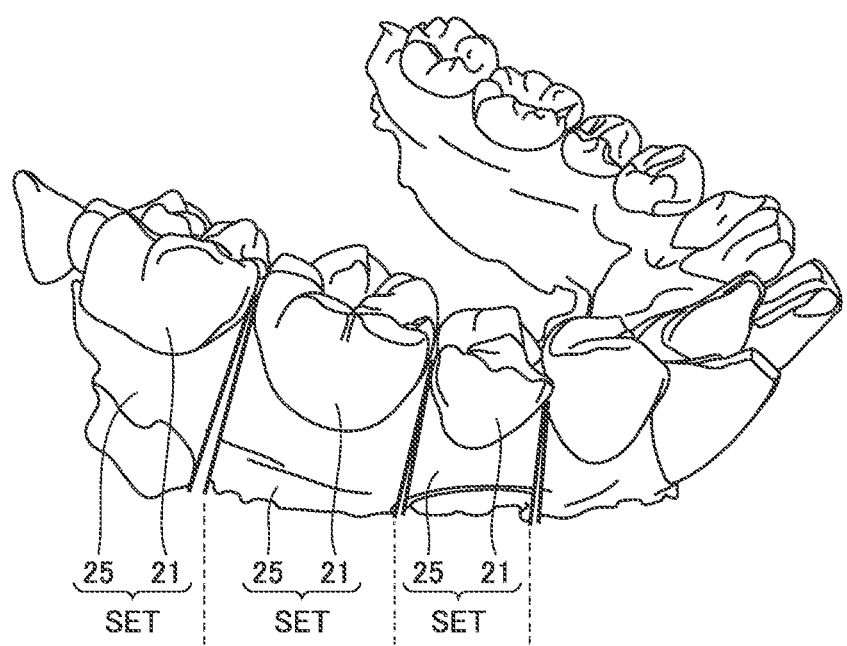

FIG.14
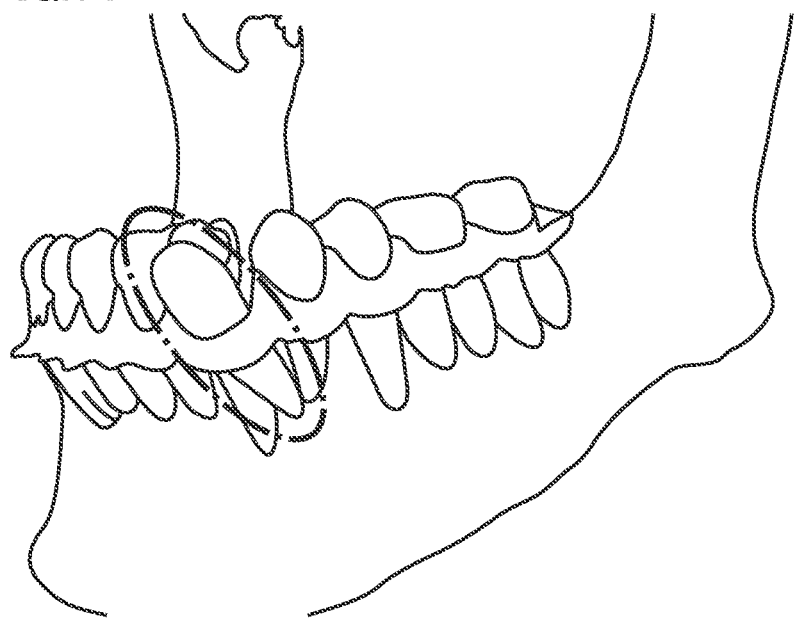
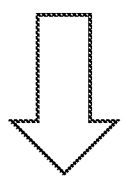 ORTHODONTIC SIMULATION
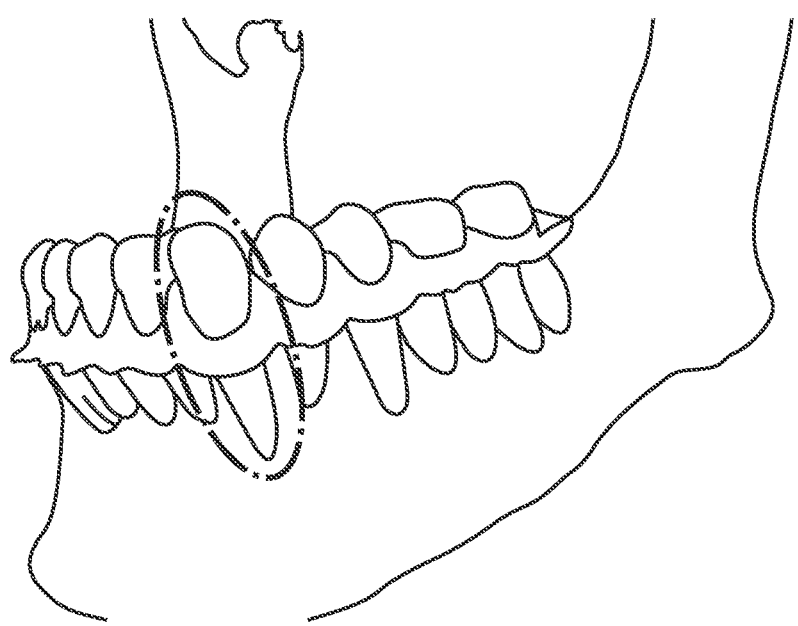

FIG.15
IOS CROWN 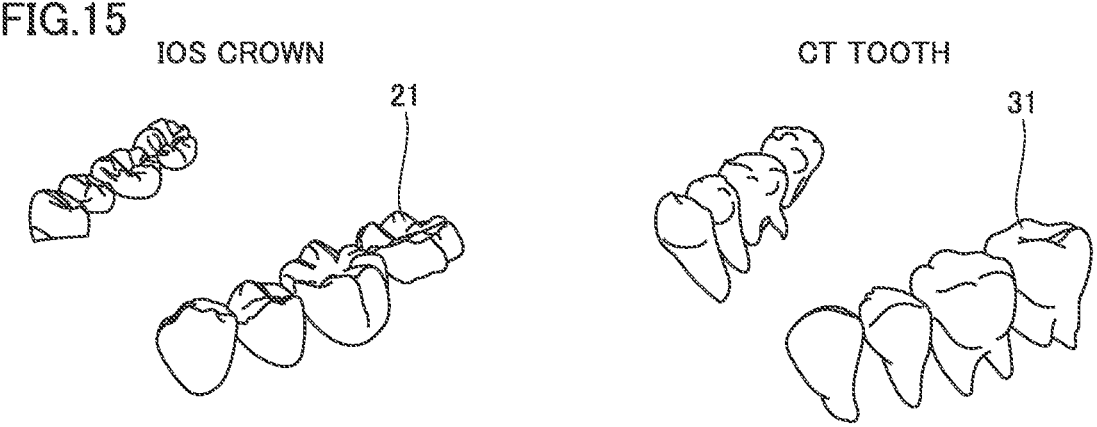 CT TOOTH
SYNTHESIZE IOS CROWN ACCORDING TO CT TOOTH
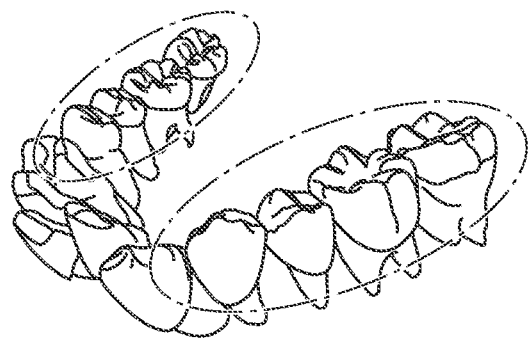

FIG.18
IOS CROWN
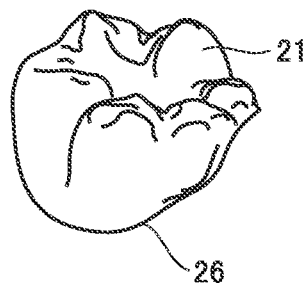
CT TOOTH
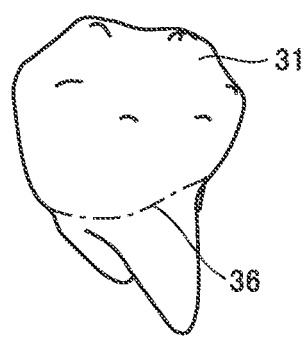
COUPLE IOS CROWN AND CT TOOTH

DATA PROCESSING APPARATUS AND DATA PROCESSING METHOD

CROSS REFERENCE TO RELATED APPLICATIONS

This nonprovisional application is based on Japanese Patent Application No. 2022-100408 filed on Jun. 22, 2022, with the Japan Patent Office, the entire contents of which are hereby incorporated by reference.

BACKGROUND

Field of the Disclosure

The present disclosure relates to a data processing apparatus and a data processing method.

Description of the Background Art

There is a technique of acquiring coordinate data of a point group obtained by scanning inside of a mouth of a target person such as a patient with an intra oral scanner (IOS; hereinafter such data will be referred to as "IOS data"), and volume data obtained by capturing the inside of the mouth of the target person by an X-ray imaging device (hereinafter such data will be referred to as "CT (Computed Tomography) data"), and of forming a virtual model by synthesizing the pieces of data.

SUMMARY

In relation to synthesis of the IOS data and the CT data, how the pieces of data should be synthesized to accurately generate three-dimensional data of a tooth row is conventionally not made apparent, and details are not given in Japanese Patent Laying-Open No. 2019-51323 either.

The present disclosure has been made to solve such a problem, and is aimed at accurately generating three-dimensional data of a tooth row using the IOS data and the CT data.

According to an example of the present disclosure, there is provided a data processing apparatus for processing three-dimensional data.

The data processing apparatus includes: an input portion configured to receive at least first data and second data as an input, the first data being obtained by performing scanning by a scanner that is inserted inside a mouth of a target person and including coordinate data of a point group indicating a surface shape of a tooth row including a first crown and gingiva, the second data being obtained by capturing at least the tooth row inside the mouth of the target person by an X-ray imaging device and including volume data of a second crown; and processing circuitry configured to convert the first data and the second data into a common data format, and synthesize the first data and the second data after conversion with each other. The processing circuitry replaces, in the second data, the second crown included in the second data with which a shape of the first crown matches, with the first crown included in the first data, and performs synthesis in such a way that the gingiva is arranged near the first crown after replacement.

According to an example of the present disclosure, there is provided a data processing method for processing three-dimensional data. The data processing method includes receiving at least first data and second data, the first data being obtained by performing scanning by a scanner that is inserted inside a mouth of a target person and including coordinate data of a point group indicating a surface shape of a tooth row including a first crown and gingiva, the second data being obtained by capturing at least the tooth row inside the mouth of the target person by an X-ray imaging device and including volume data of a second crown; and converting the first data and the second data into a common data format, and synthesizing the first data and the second data after conversion with each other. The synthesizing the first data and the second data includes, in relation to the second data, replacing the second crown included in the second data with which a shape of the first crown matches, with the first crown included in the first data, and performing synthesis in such a way that the gingiva is arranged near the first crown after replacement.

The above-described and other objects, features, aspects, and advantages of the disclosure will be made clear by the detailed description below about the disclosure that is to be understood in connection with the appended drawings.

BRIEF DESCRIPTION OF THE DRAWINGS

FIG. 11 is a diagram (first) showing a synthesis method for IOS data and CT data;

FIG. 13 is a diagram (second) showing the synthesis method for the IOS data and the CT data;

FIG. 14 is a diagram showing a method of a simulation process;

FIG. 15 is a diagram (first) for describing a synthesis method for the IOS crown and the CT tooth;

FIG. 18 is a diagram (second) for describing the synthesis method for the IOS crown and the CT tooth.

DETAILED DESCRIPTION

Figure 1:
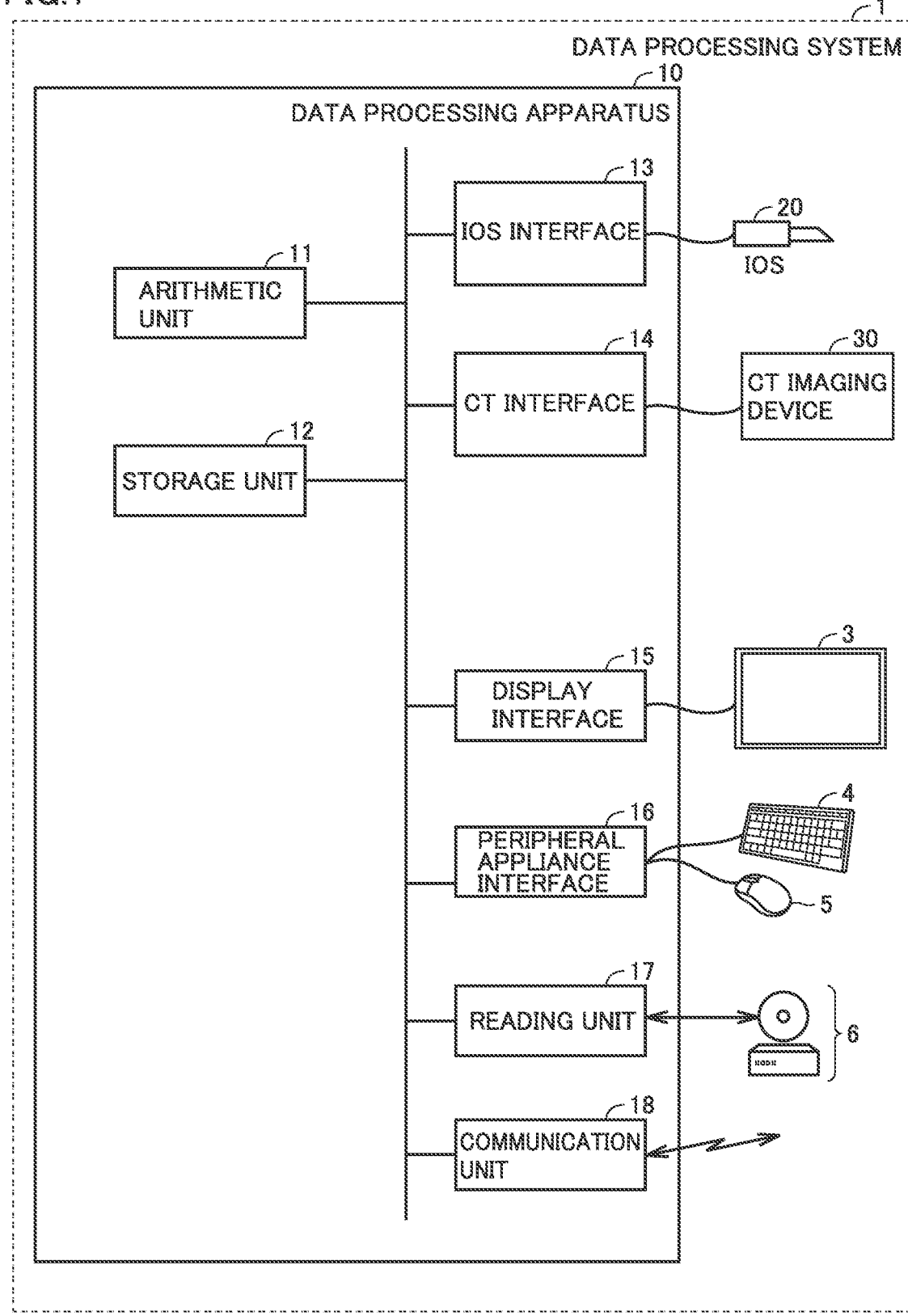
FIG. 1 is a diagram schematically showing an overall configuration of a data processing system including a data processing apparatus.

An embodiment of the present disclosure will be described in detail with reference to the drawings. Additionally, same or corresponding parts in the drawings are denoted by a same reference sign, and redundant description will not be given.

[Overall Configuration of Data Processing System]

FIG. 1 is a diagram schematically showing an overall configuration of a data processing system 1 including a data processing apparatus 10 according to the present embodiment.

Data processing system 1 includes data processing apparatus 10, a three-dimensional scanner 20, and a CT imaging device 30. A display 3, a keyboard 4, and a mouse 5 are connected to data processing apparatus 10, in addition to three-dimensional scanner 20 and CT imaging device 30.

Three-dimensional scanner 20 is a so-called intra oral scanner (IOS) that optically captures an inside of a mouth by a confocal method or a triangulation method. More specifically, three-dimensional scanner 20 scans the inside of a mouth by radiating light from a light source on the inside of the mouth, and thereby obtains, as three-dimensional data, position information (coordinate data on axes in a vertical direction, a horizontal direction, and a height direction) of each point of a point group (a plurality of points) indicating a surface shape of an object, and color information, by using an optical sensor or the like. Moreover, by scanning an impression model that is acquired in advance, surface shapes of teeth, gingiva, and the like may also be acquired.

Figure 2:
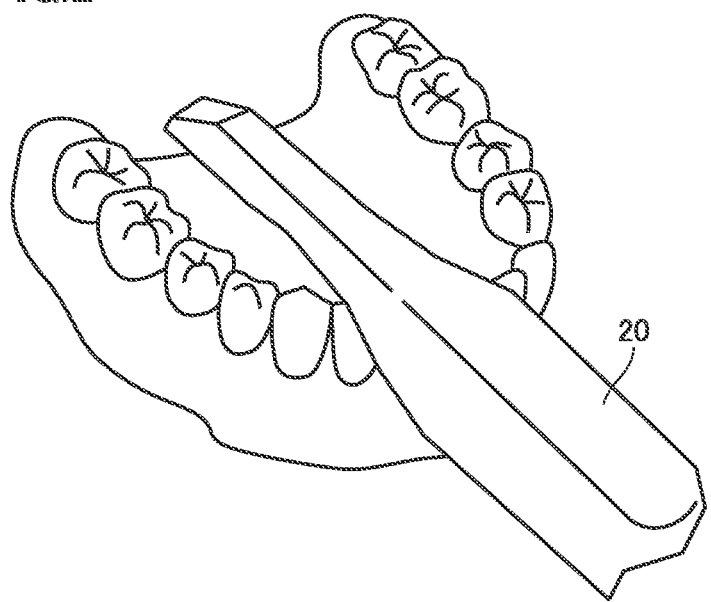
FIG. 2 is a diagram schematically showing a state where a three-dimensional scanner is inserted inside a mouth of a target person.

FIG. 2 is a diagram schematically showing a state where three-dimensional scanner 20 is inserted inside a mouth of a target person. A user is able to acquire the coordinate data of a point group indicating surface shapes of a plurality of objects inside the mouth of the target person, and the color information by scanning the inside of the mouth of the target person using three-dimensional scanner 20. The "user" may be any person who is to acquire the three-dimensional data of an object such as a tooth using three-dimensional scanner 20, such as a surgeon, a dentist, a dental assistant, a professor or a student at a dental college, a dental technician, a technician at a manufacturer, or a worker at a manufacturing facility. The "target person" may be any person who is a potential scan target of three-dimensional scanner 20, such as a patient at a dental clinic or a test subject at a dental college. The "object" may be anything that is a potential scan target of three-dimensional scanner 20, such as a tooth or gingiva inside the mouth of the target person.

A measurement range that three-dimensional scanner 20 is able to measure at one time is limited. Accordingly, in the case where the user desires to acquire the three-dimensional data of an entire tooth row (dental arch) inside a mouth, the user performs, a plurality of times along the entire tooth row, an operation of performing partial scanning by manually moving three-dimensional scanner 20 along the tooth row inside the mouth. Manually moving three-dimensional scanner 20 inside the mouth, along the tooth row, will be referred to also as scanning.

Figure 3:
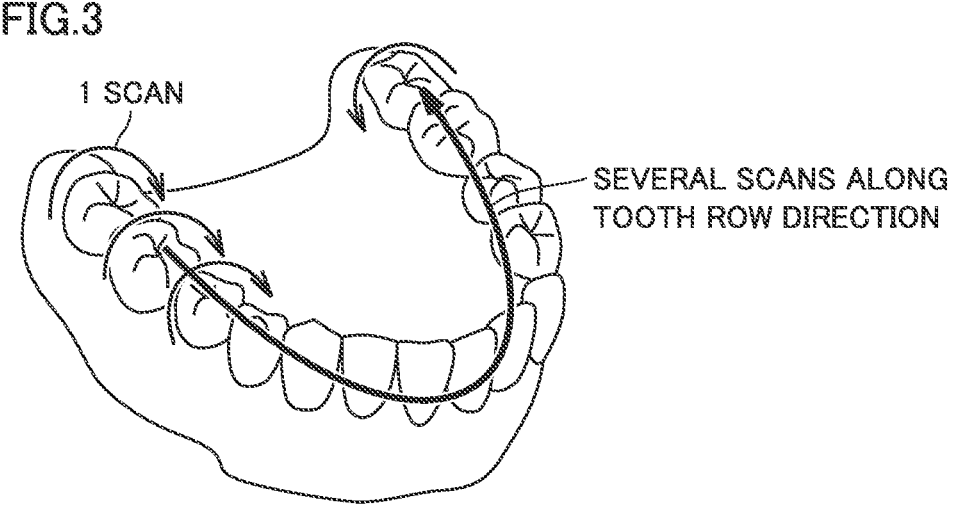
FIG. 3 is a diagram for describing an example of a method of scanning a lower tooth row with the three-dimensional scanner.

FIG. 3 is a diagram for describing an example of a method of scanning a lower tooth row with three-dimensional scanner 20. In the example shown in FIG. 3, the user performs scanning by moving three-dimensional scanner 20 from outer side surfaces (cheek side surfaces) of some teeth to inner side surfaces (lingual surfaces) across occlusal surfaces. An operation of performing scanning in a state where an optical axis of the scanner is the same is taken as one scan, and such scan is repeated several times along a tooth row direction, for example, in order from one molar side (a right-end molar) to the other molar side (a left-end molar) across front teeth (incisors). The entire lower tooth row is thereby scanned.

The three-dimensional data of an entire tooth row inside a mouth is obtained by joining, at overlapping shapes, pieces of three-dimensional data obtained by performing partial scanning several times in the manner described above. The three-dimensional data obtained in this manner is coordinate data of a point group indicating the surface shape of the tooth row, and the three-dimensional data includes XYZ coordinate data indicating a three-dimensional position of each point and RGB data indicating a color of each point. A two-dimensional data of the surface shape of the tooth row seen from an unspecified point of view may be generated using the three-dimensional data.

Figure 4:
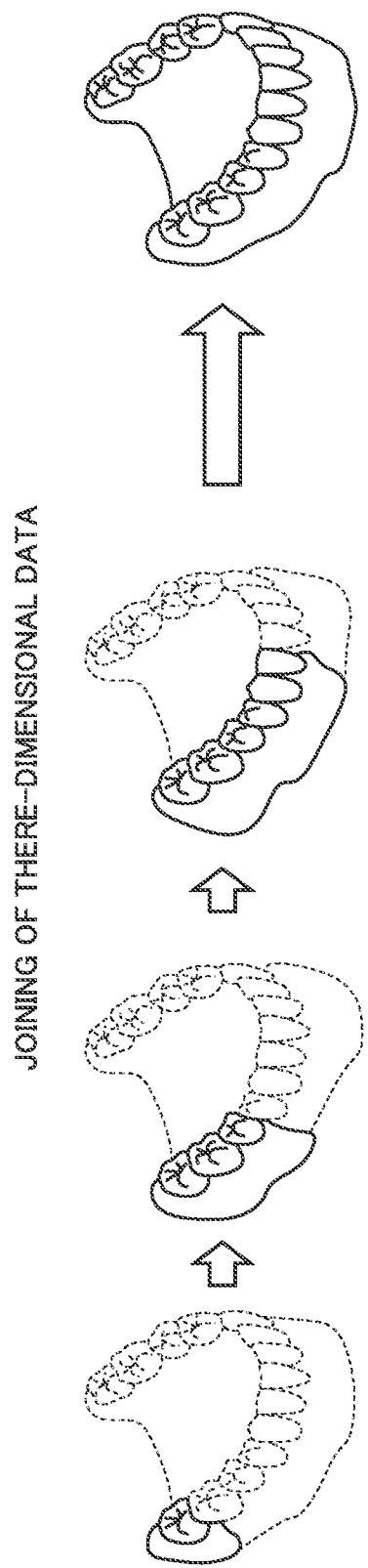
FIG. 4 is a diagram for describing a method of generating three-dimensional data of an entire tooth row.

FIG. 4 is a diagram for describing a method of generating the three-dimensional data of an entire tooth row by joining pieces of three-dimensional data that are obtained by performing partial scanning several times. As shown in FIG. 4, three-dimensional data obtained by one scan is joined to three-dimensional data obtained in the next one scan at parts with a common shape, and three-dimensional data of an entire tooth row is finally generated.

In the following, a tooth row based on three-dimensional surface coordinate data that is acquired by three-dimensional scanner 20 (such data will be referred to as "IOS data") will be referred to also as "IOS tooth row". Data for displaying a two-dimensional image of the IOS tooth row will be referred to also as "IOS tooth row image data".

Referring back to FIG. 1, CT imaging device 30 is an X-ray imaging device that captures an upper jaw and a lower jaw of a target person by turning a transmitter and a receiver for X-ray, which is a type of radiation, around a face of the target person. By capturing the upper jaw and the lower jaw of the target person by CT imaging device 30, three-dimensional volume (voxel) data around the upper jaw and the lower jaw of the target person may be obtained. By sectioning the volume data of an object obtained by the X-ray imaging device, a tomographic image and an external appearance image of the object may be generated. Additionally, with respect to pieces of soft tissue that are next to each other and that have approximately same X-ray absorption coefficient, such as gingiva, cheek, and tongue, a boundary is blurred and the surface shape cannot be grasped, and thus, data of hard tissue such as teeth and bones is mainly used.

In the following, a tooth row based on the three-dimensional volume data (CT data) that is acquired by CT imaging device 30 will be referred to also as "CT tooth row". Data for displaying a two-dimensional image of the CT tooth row on display 3 and the like will be referred to also as "CT tooth row image data".

Data processing apparatus 10 allows a user to view a two-dimensional projection showing the surface of a tooth row from a specific direction, by generating the IOS tooth row image data seen from an unspecified point of view based on the IOS data and by displaying an IOS tooth row image on display 3. In the same manner, data processing apparatus 10 allows a user to view a two-dimensional projection showing the surface of a tooth row from a specific direction, by generating the CT tooth row image data seen from an unspecified point of view based on the CT data and by displaying a CT tooth row image on display 3.

Furthermore, data processing apparatus 10 may convert the IOS data and the CT data into a common data format, synthesize the IOS data and the CT data after conversion, and cause a synthesized image seen from an unspecified point of view to be displayed on display 3 based on synthesized coordinate data. The process of conversion into a common data format may be a process of converting the IOS data and the CT data into two-dimensional image data (such as GIF, PNG, TIFF, or BMP) seen from an unspecified point of view, or may be a process of converting one of the IOS data and the CT data into a data format of the other to achieve common data format. The synthesis method for the IOS data and the CT data will be described below in detail.

As main hardware elements, data processing apparatus 10 includes an arithmetic unit 11, a storage unit 12, an IOS interface 13, a CT interface 14, a display interface 15, a peripheral appliance interface 16, a reading unit 17, and communication unit 18. Additionally, data processing apparatus 10 may be implemented by a general-purpose computer, or may be implemented by a computer (a server) dedicated to data processing system 1, for example.

Arithmetic unit 11 is processing circuitry (an arithmetic device) that performs various processes by executing various programs, and is an example of a computer. For example, arithmetic unit 11 is configured by at least one of a central processing unit (CPU), a field-programmable gate array (FPGA), and a graphics processing unit (GPU). Additionally, arithmetic unit 11 may be configured by one chip, or may be configured by a plurality of chips. Furthermore, one or some or all of the functions of arithmetic unit 11 may be provided in a server apparatus (such as a cloud server apparatus), not shown.

Storage unit 12 includes a volatile storage area (such as a working area) that temporarily stores a program code, a work memory, and the like at the time of execution of an unspecified program by arithmetic unit 11. For example, storage unit 12 is configured by a volatile memory device such as a dynamic random access memory (DRAM) or a static random access memory (SRAM). Furthermore, storage unit 12 includes a non-volatile storage area. For example, storage unit 12 is configured by a non-volatile memory device such as a read only memory (ROM), a hard disk, or a solid state drive (SSD).

IOS interface 13 is an interface for connecting three-dimensional scanner 20, and achieves input/output of data between data processing apparatus 10 and three-dimensional scanner 20. Data processing apparatus 10 and three-dimensional scanner 20 are communicably connected in a wired or wireless manner.

CT interface 13 is an interface for connecting CT imaging device 30, and achieves input/output of data between data processing apparatus 10 and CT imaging device 30. Data processing apparatus 10 and CT imaging device 30 are communicably connected in a wired or wireless manner.

Additionally, in FIG. 1, IOS interface 13 and CT interface 14 are shown to be separate from each other, but IOS interface 13 and CT interface 14 may be integrated as one input portion.

Display interface 15 is an interface for connecting display 3, and achieves input/output of data between data processing apparatus 10 and display 3.

Peripheral appliance interface 16 is an interface for connecting peripheral appliances such as keyboard 4, mouse 5, and the like, and achieves input/output of data between data processing apparatus 10 and the peripheral appliance.

Reading unit 17 reads out various pieces of data stored in a removable disk 6 that is a storage medium. For example, reading unit 17 may acquire a data processing program from removable disk 6.

Communication unit 18 transmits/receives data from the dental laboratory or the automatic manufacturing apparatus by wired communication or wireless communication.

For example, data processing apparatus 10 transmits, to the dental laboratory or the like via communication unit 18, the three-dimensional coordinate data (the IOS data, the CT data), the two-dimensional image data (the IOS tooth row image data, the CT tooth row image data), and the like described above.

In the dental laboratory, a dental technician creates a dental model such as a dental prosthesis based on the data acquired from data processing apparatus 10. Additionally, in the case where an automatic manufacturing apparatus that is capable of automatically manufacturing the dental model, such as a milling machine or a 3D printer, is installed in a dental clinic, data from data processing apparatus 10 may be transmitted to the automatic manufacturing apparatus.

[IOS Tooth Row Image]

Figure 5:
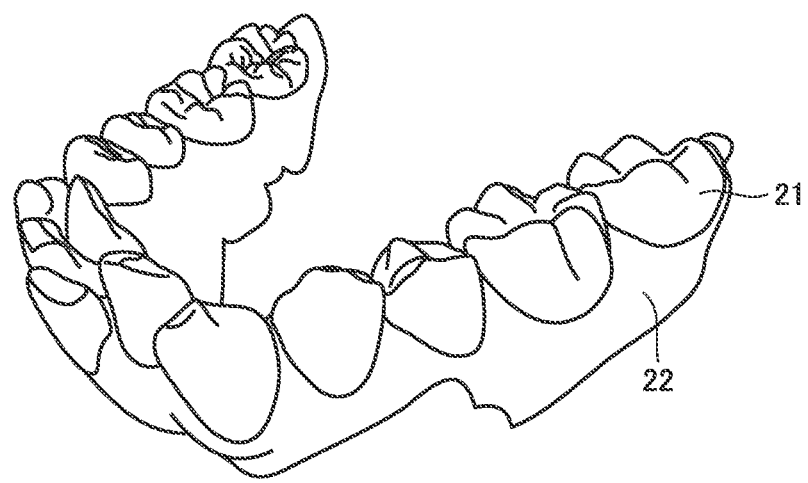
FIG. 5 is a diagram showing an example of an IOS tooth row image.

FIG. 5 is a diagram showing an example of the IOS tooth row image that is displayed based on the IOS tooth row image data. Additionally, FIG. 5 shows an image of the lower tooth row as the IOS tooth row image, but the IOS tooth row image may instead include an image of an upper tooth row.

Generally, a tooth is segmented into a crown that is exposed from gingiva, and a root that is covered in the gingiva.

As described above, three-dimensional scanner 20 scans inside of a mouth by radiating light from a light source inside the mouth, and thus acquires coordinate data of a point group indicating a surface shape of a tooth row. Accordingly, the IOS tooth row image includes images of a crown 21 and a gingiva 22 that are irradiated with the light from the light source, but does not include an image of a root where the light from the light source does not reach.

Additionally, the IOS data includes advantages as follows.
Accurate surface shape data of each crown 21 may be acquired.
Surface shape data of soft tissue such as gingiva 22 may be acquired.
An outer shape image of a tooth row seen from an unspecified point of view may be generated.
Color data may be acquired.
However, the IOS data includes disadvantages as follows.
Three-dimensional data of the entire tooth row is completed by joining pieces of partial three-dimensional data that are acquired by manual scanning, and thus, the shape of the entire tooth row is possibly not accurate.
Shape data of the root where the light does not reach cannot be acquired.
Data of inner parts where the light does not reach cannot be acquired, and thus, a tomographic image cannot be generated.

In the following, the crown and the gingiva included in the IOS data will be referred to also as "IOS crown" and "IOS gingiva", respectively.

[CT Tooth Row Image]

Figure 6:
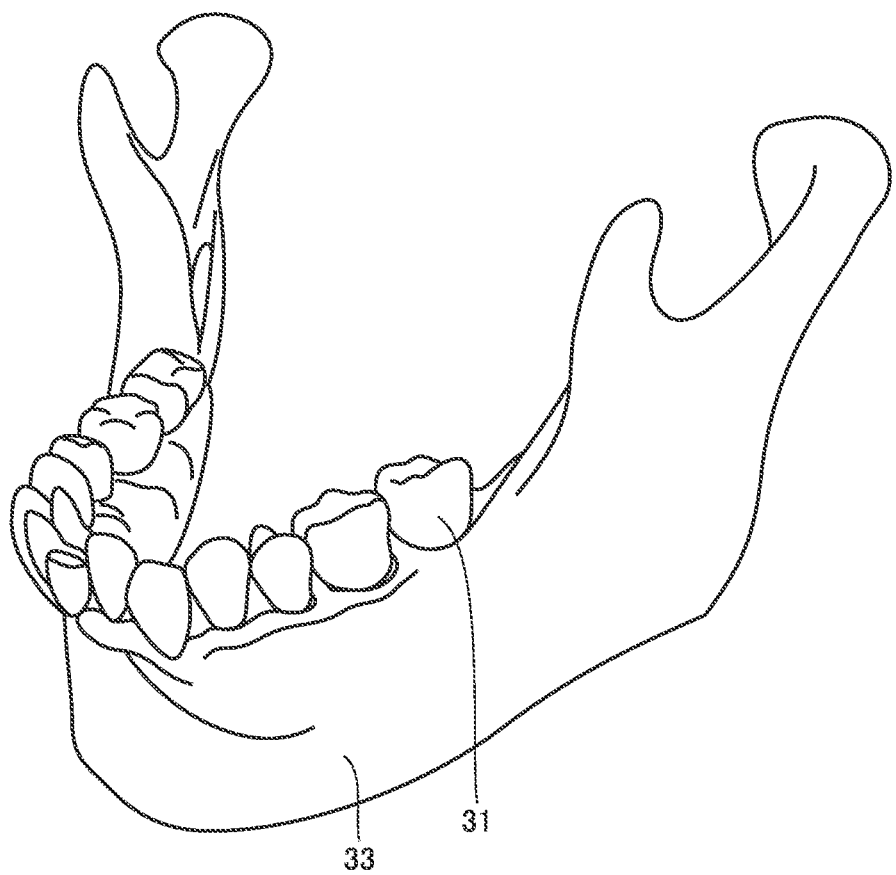
FIG. 6 is a diagram showing an example of a CT tooth row image.

FIG. 6 is a diagram showing an example of the CT tooth row image that is displayed based on the CT tooth row image data. Additionally, FIG. 6 shows an image of the lower tooth row as the CT tooth row image, but the CT tooth row image may instead include an image of the upper tooth row.

As described above, CT imaging device 30 acquires the volume data of a region inside the mouth. The CT tooth row image includes images of teeth 31 and jaw 33, which are hard tissue, but images of gingiva, which is soft tissue, cannot be used in most cases.

Additionally, the CT data includes advantages as follows.
Accurate shape data of the entire tooth row may be acquired.
Shape data of entire tooth 31 including the crown and the root may be acquired.

Shape data of jaw 33 may be acquired in addition to shape data of tooth 31.

Surface shape data of a tooth row may be generated.

A tomographic image may be generated.

However, the CT data includes disadvantages as follows.

Shape data of soft tissue, such as gingiva, that is in contact with another soft tissue, such as cheek or tongue, is difficult to acquire.

In the case where there is a high X-ray absorbing body, such as a metal dental prosthesis, in or around the crown, reconstructed shape data is possibly inaccurate.

Color data cannot be acquired.

In the following, the tooth and the jaw included in the CT data will be referred to also as "CT tooth" and "CT jaw", respectively.

[Synthesis Method for IOS Data and CT Data]

As described above, with the IOS data, there is an advantage that the shape data of the gingiva can be acquired, but there is a disadvantage that accurate shape data of the entire tooth row cannot be acquired. In contrast, with the CT data, accurate shape data of the entire tooth row can be acquired, but there is a disadvantage that shape data of the gingiva is difficult to acquire.

At the time of synthesizing the IOS data and the CT data, arithmetic unit 11 of data processing apparatus 10 makes up for the disadvantage of one type of data by the advantage of the other type of data, and thereby generates three-dimensional data including the shape of the gingiva while including the accurate shape of the tooth row.

More specifically, arithmetic unit 11 synthesizes the surface shape data of IOS gingiva 22 with the CT data showing an accurate shape of the entire tooth row. At this time, arithmetic unit 11 first performs a process of replacing a crown part of CT tooth 31 whose surface shape matches (is most similar to) that of IOS crown 21 with IOS crown 21 (hereinafter, such a process will be referred to also as "positioning"). Next, arithmetic unit 11 performs synthesis such that IOS gingiva 22 is arranged near IOS crown 21 after replacement by the positioning. At this time, to facilitate positioning for each tooth, each tooth is segmented in advance in relation to the IOS crown. Also with respect to the CT data, each tooth may be segmented in advance. Segmentation of a tooth refers to recognition by arithmetic unit 11 of a limit of a region of each tooth. Furthermore, arithmetic unit 11 may recognize a tooth type (number) of each tooth.

Figure 7:
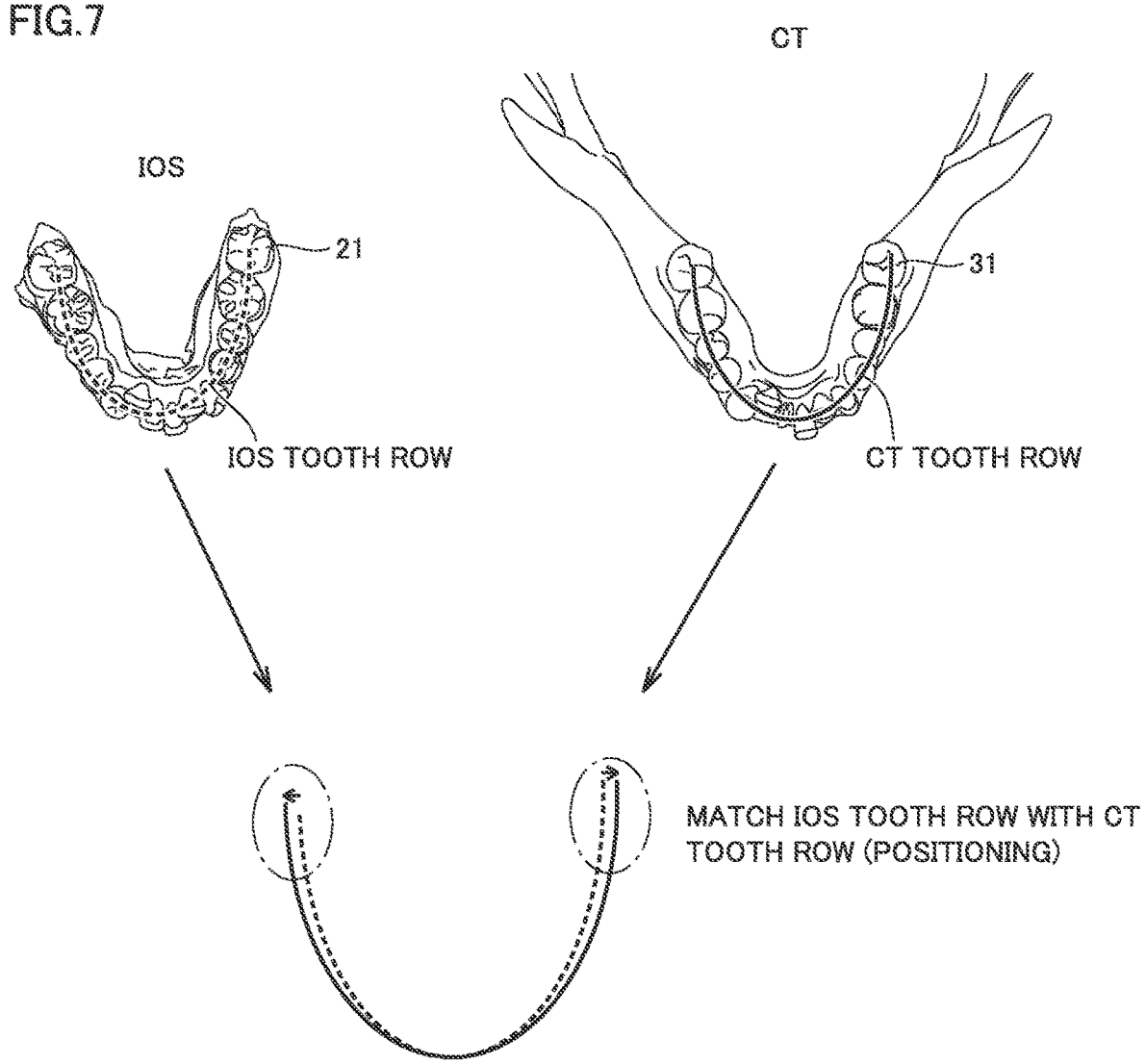
FIG. 7 is a diagram for describing a method of positioning of an IOS crown and a crown part of a CT tooth relative to each other.

FIG. 7 is a diagram for describing a method of positioning of IOS crown 21 and a crown part of CT tooth 31 relative to each other. Because more position measurement errors are included in the entire IOS tooth row than in the CT tooth row, coordinates are shifted between the IOS tooth row and the CT tooth row.

Accordingly, arithmetic unit 11 adjusts the IOS tooth row including more position measurement errors to the CT tooth row that is more accurate. More specifically, arithmetic unit 11 identifies, for each IOS crown 21, CT tooth 31 whose crown part has a shape matching IOS crown 21, and replaces the crown part of CT tooth 31 that is identified with IOS crown 21. A position of IOS crown 21 is shifted by the positioning, and a gap is created between IOS crown 21 after positioning and IOS gingiva 22.

Figure 8:
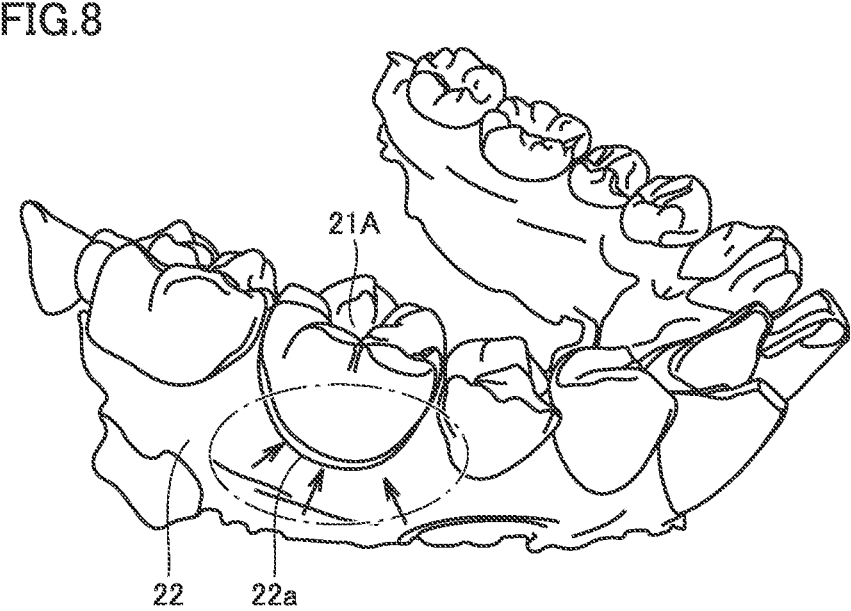
FIG. 8 is a diagram showing an example of a state of the IOS crown after positioning and an IOS gingiva.

FIG. 8 is a diagram showing an example of a state of an IOS crown 21A after positioning and IOS gingiva 22. In the example shown in FIG. 8, because the position of IOS crown 21A is shifted inward due to the positioning, a gap is created between IOS crown 21A and a periphery (a part of IOS gingiva 22 that faces IOS crown 21A) 22a of IOS gingiva 22.

Accordingly, arithmetic unit 11 corrects data of the periphery of IOS gingiva 22 to interpolate the gap that is created between IOS crown 21A after positioning and periphery 22a of IOS gingiva 22. That is, arithmetic unit 11 performs morphing of deforming periphery 22a of IOS gingiva 22 to be smoothed toward IOS crown 21A in such a way that the gap is filled, and periphery 22a of IOS gingiva 22 is joined to IOS crown 21A after positioning.

Figure 9:
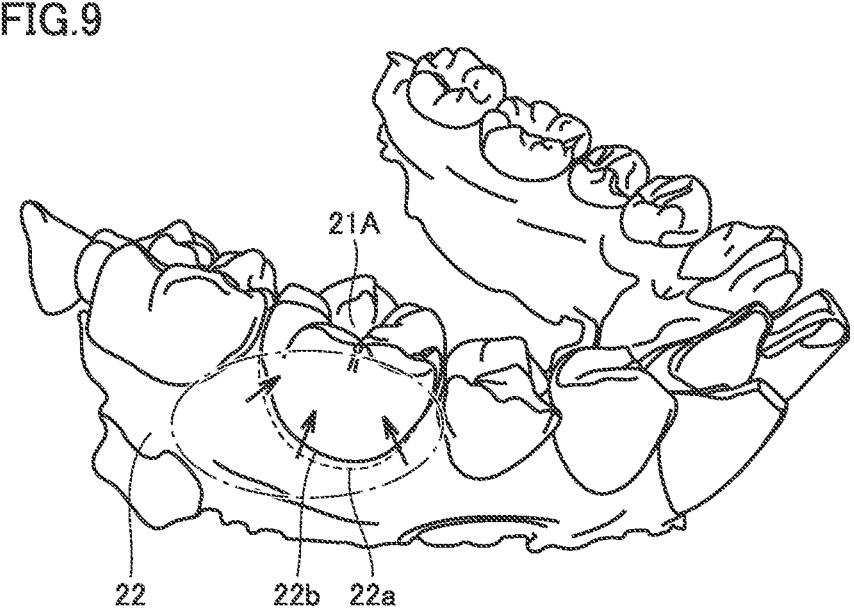
FIG. 9 is a diagram showing an example of a state of the IOS crown after positioning and the IOS gingiva after morphing.

FIG. 9 is a diagram showing an example of a state of IOS crown 21A after positioning and IOS gingiva 22 after morphing. As shown in FIG. 9, the gap that is created by position of IOS crown 21A being shifted inward by positioning is filled by a periphery 22b of IOS gingiva 22 after morphing.

Then, arithmetic unit 11 synthesizes data of IOS gingiva 22 after morphing with the CT data showing an accurate shape of the tooth row. The three-dimensional data showing the shape of the gingiva may thereby be generated while maintaining the accurate shape of the tooth row. As a result, three-dimensional data of inside of the mouth that is more suitable for diagnosis and treatment of the target person may be generated.

[Flowchart]

Figure 10:
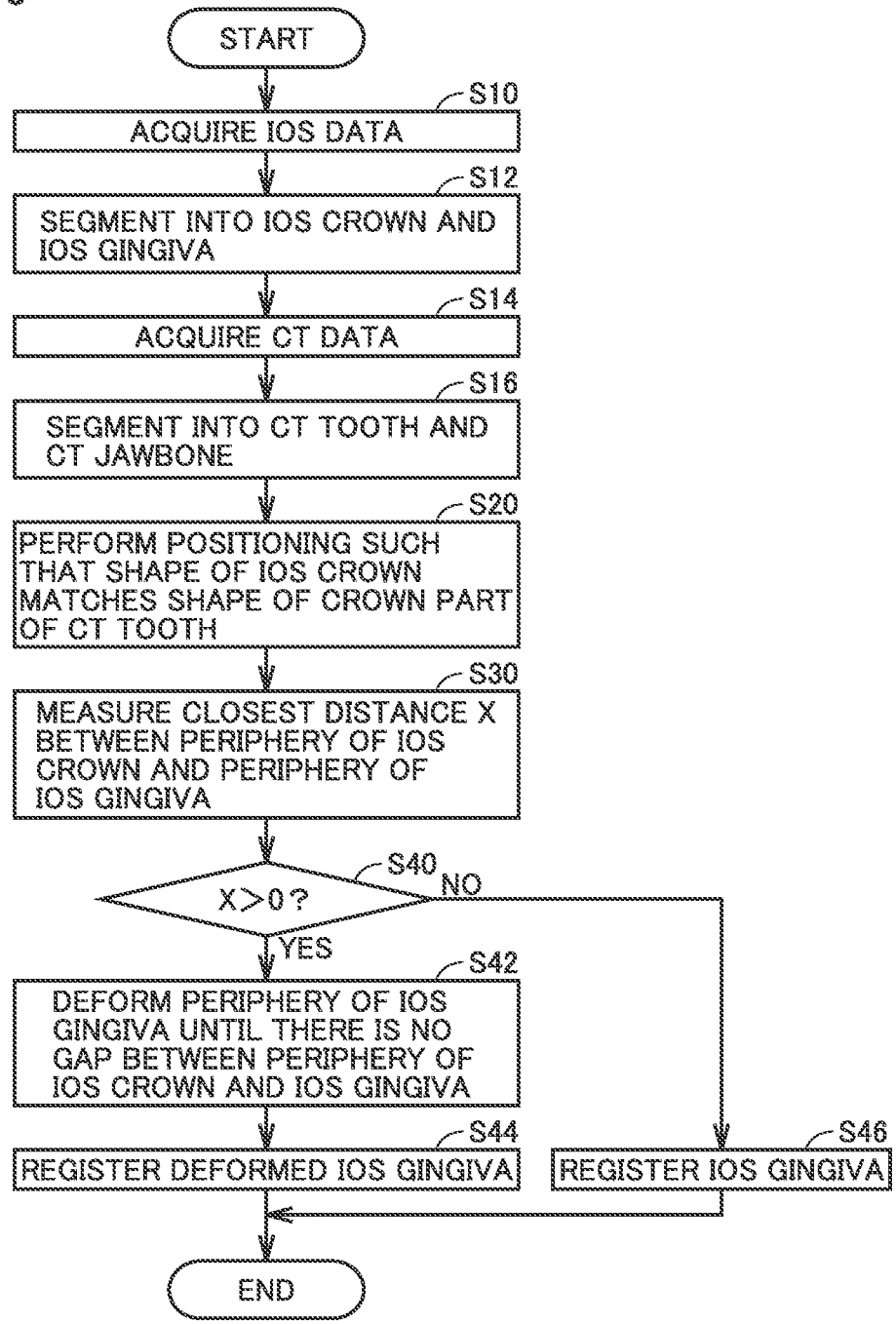
FIG. 10 is a flowchart (first) showing an example of a procedure by an arithmetic unit.

FIG. 10 is a flowchart showing an example of a procedure that is performed by arithmetic unit 11 at the time of synthesizing the IOS data and the CT data.

Arithmetic unit 11 acquires the IOS data (step S10), and segments the acquired IOS data into the IOS crown and the IOS gingiva (step S12).

Next, arithmetic unit 11 acquires the CT data (step S14), and segments the acquired CT data into the CT tooth and a CT jawbone (step S16).

Next, arithmetic unit 11 performs replacement in relation to the IOS crown such that the surface shape of the IOS crown matches (coincides with) the surface shape of the crown part of the CT tooth (step S20). This process is the positioning described above.

Next, arithmetic unit 11 measures a closest distance X between a periphery of the IOS crown after positioning and the periphery of the IOS gingiva (step S30). Additionally, closest distance X is a shortest distance between a predetermined point on the periphery of the IOS gingiva and the periphery of the IOS crown after positioning. Arithmetic unit 11 determines whether closest distance X that is measured is greater than zero or not (step S40).

In the case where closest distance X that is measured is greater than zero (YES in step S40), or in other words, in the case where there is a gap between the periphery of the IOS crown after positioning and the periphery of the IOS gingiva, arithmetic unit 11 deforms the periphery of the IOS gingiva until there is no more gap (step S42). This process is the morphing described above. Then, arithmetic unit 11 registers the deformed IOS gingiva (step S44).

In the case where closest distance X that is measured is not greater than zero (NO in step S40), or in other words, in the case where there is no gap between the periphery of the IOS crown after positioning and the periphery of the IOS gingiva, arithmetic unit 11 registers the IOS gingiva without performing the morphing described above (step S46).

Additionally, data of the IOS gingiva that is registered in step S44 or step S46 is synthesized with the CT data showing the accurate shape of the tooth row.

As described above, at the time of synthesizing the IOS data and the CT data, arithmetic unit 11 according to the present embodiment performs segmentation with respect to the IOS crown and the IOS gingiva included in the IOS data, performs replacement in relation to the IOS crown such that the surface shape of the IOS crown matches the surface shape of the crown part of the CT tooth, and performs correction (morphing) of data of the periphery of the IOS gingiva to interpolate the gap between the IOS crown and the IOS gingiva that is created by replacement related to the IOS crown. Then, data of the IOS gingiva after correction is synthesized with the CT data showing the accurate shape of the tooth row. The three-dimensional data showing the shape of the gingiva may thereby be generated while maintaining the accurate shape of the tooth row.

<First Modification>

At the time of synthesizing the IOS data and the CT data, arithmetic unit 11 according to the embodiment described above performs segmentation with respect to the IOS crown and the IOS gingiva included in the IOS data, performs replacement in relation to the IOS crown such that the surface shape of the IOS crown matches the surface shape of the crown part of the CT tooth, and performs correction of data of the periphery of the IOS gingiva to interpolate the gap between the IOS crown and the IOS gingiva that is created by replacement related to the IOS crown.

However, the synthesis method for the IOS data and the CT data is not limited to the method according to the embodiment described above. For example, the synthesis method for the IOS data and the CT data may be modified in the following manner.

FIG. 11 is a diagram showing a synthesis method for the IOS data and the CT data according to a first modification. At the time of synthesizing the IOS data and the CT data, arithmetic unit 11 according to the first modification segments the IOS data into IOS crown 21, an adjacent portion 23 that is a part of IOS gingiva 22 that is adjacent to IOS crown 21, and a non-adjacent portion 24 that is a part of IOS gingiva 22 that is not adjacent to IOS crown 21.

Then, arithmetic unit 11 according to the first modification performs positioning to perform replacement in relation to a set of IOS crown 21 and adjacent portion 23 of the IOS gingiva such that the surface shape of IOS crown 21 after segmentation matches the surface shape of the crown part of the CT tooth. A gap is created, by the positioning, between adjacent portion 23 of the IOS gingiva and non-adjacent portion 24. Accordingly, arithmetic unit 11 according to the first modification performs correction (morphing) of data of at least one of adjacent portion 23 and non-adjacent portion 24 of the IOS gingiva such that the gap between adjacent portion 23 and non-adjacent portion 24 of the IOS gingiva is interpolated.

By performing replacement, by positioning, not only with respect to IOS crown 21 but also with respect to the set of IOS crown 21 and adjacent portion 23 of the IOS gingiva in the above manner, data where a boundary part between the crown and the gingiva is more natural may be generated.

<Second Modification>

The synthesis method for the IOS data and the CT data may also be modified in the following manner.

As described with reference to FIGS. 2 to 4 described above, in the case where a user wants to acquire data of the entire tooth row using three-dimensional scanner 20, the user performs, a plurality of times along the entire tooth row, an operation of performing partial scanning by manually moving three-dimensional scanner 20 inside the mouth. Data of the IOS tooth row is acquired by joining pieces of three-dimensional data that are obtained by performing partial scanning a plurality of times in the manner described above.

At the time of performing manual scanning using three-dimensional scanner 20, errors may be accumulated in the tooth row direction due to movement of the hand of the user operating three-dimensional scanner 20 or movement of the head of a scanning target person, for example, and positions may be shifted between left and right teeth. A width of such a shift between positions may be different for each user or for each scan. Due to influence of the shift between positions, errors tend to accumulate in the tooth row direction with respect to the IOS tooth row.

With respect to the data of the IOS crown, an error in a vertical direction of a tooth (a direction from an occlusal surface to the root) is substantially nil or extremely small.

Figure 12:
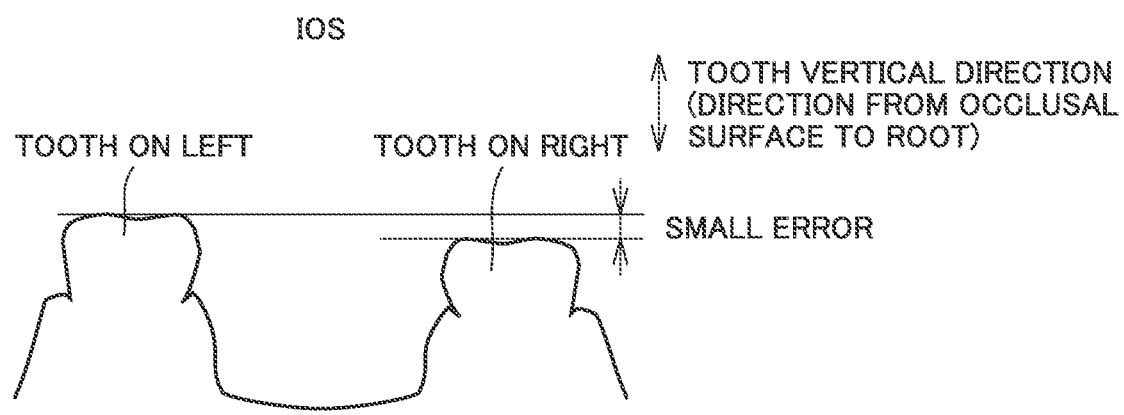
FIG. 12 is a diagram schematically showing a cross-sectional shape of a tooth row.

FIG. 12 is a diagram schematically showing a cross-sectional shape of a tooth row. In the example shown in FIG. 12, there is a difference between a tooth on the left and a tooth on the right in the vertical direction of the teeth (the direction from the occlusal surface to the root). With the data of the IOS crown, high accuracy is achieved with respect to the vertical direction of the teeth, and such a difference is accurately reflected.

Accordingly, at the time of synthesizing IOS gingiva 22 with the CT data, arithmetic unit 11 according to a second modification divides the IOS crowns and the IOS gingiva in the vertical direction of the tooth (a direction that is substantially perpendicular to the tooth row direction), and performs positioning of performing replacement in relation to a set of the divided IOS crown and a divided portion of the IOS gingiva.

FIG. 13 is a diagram showing the synthesis method for the IOS data and the CT data according to the second modification. At the time of synthesizing the IOS data and the CT data, arithmetic unit 11 according to the second modification segments the IOS data into a plurality of IOS crowns 21 of a plurality of teeth and IOS gingiva 22, and further segments IOS gingiva 22 into a plurality of divided gingiva portions 25 that are adjacent to plurality of IOS crowns 21, respectively.

Then, arithmetic unit 11 according to the second modification performs positioning of performing replacement in relation to a set of each IOS crown 21 and divided gingiva portion 25 that is adjacent to corresponding IOS crown 21 such that the surface shape of each IOS crown 21 after segmentation matches the surface shape of the CT crown corresponding to corresponding IOS crown 21. A gap is created, by the positioning, between divided gingiva portions 25 that are adjacent to each other in the tooth row direction. Accordingly, arithmetic unit 11 according to the second modification performs correction (morphing) of data of divided gingiva portion 25 such that the gap between divided gingiva portions 25 that are adjacent to each other in the tooth row direction is interpolated.

By modifying the synthesis method for the IOS data and the CT data in this manner, accuracy of position of IOS gingiva 22 in synthesized data may be increased.

<Third Modification>

FIG. 14 is a diagram showing a method of a simulation process that uses synthesized data of the IOS data and the CT data. In the case of performing a simulation process of moving a tooth included in the synthesized data of the IOS data and the CT data to a desired position for the purpose of orthodontic treatment or the like, a gap is created between the tooth and the gingiva due to the simulation process.

Correction (morphing) of data of the gingiva may be performed to interpolate such a gap. Additionally, the method of interpolating the gap is not particularly specified. For example, the gap may be interpolated by a triangular patch, or a periphery of the gingiva may be morphed and joined to a periphery of the crown to fill a boundary between the crown and the gingiva.

<Fourth Modification>

As described above, with respect to the shape of the tooth row, the CT data is more accurate than the IOS data, but with respect to the surface shape of each tooth (crown), the IOS data is more accurate than the CT data. Accordingly, in a fourth modification, data of IOS crown 21 is also synthesized with the CT data in addition to IOS gingiva 22.

FIG. 15 is a diagram for describing a synthesis method for IOS crown 21 and CT tooth 31 according to the fourth modification. The IOS data includes accurate data of the surface shape of the crown of each tooth, but does not include data of the root of each tooth, and also, accuracy of the shape of the entire tooth row (position where each tooth is arranged) is low. In contrast, the CT data includes data of an entire tooth including the crown and the root, but accuracy of the surface shape of each tooth is low.

Accordingly, in the fourth modification, data of IOS crown 21 is synthesized with data of CT tooth 31. More specifically, data of the crown part of CT tooth 31 is deformed according to the surface shape of IOS crown 21.

Figure 16:
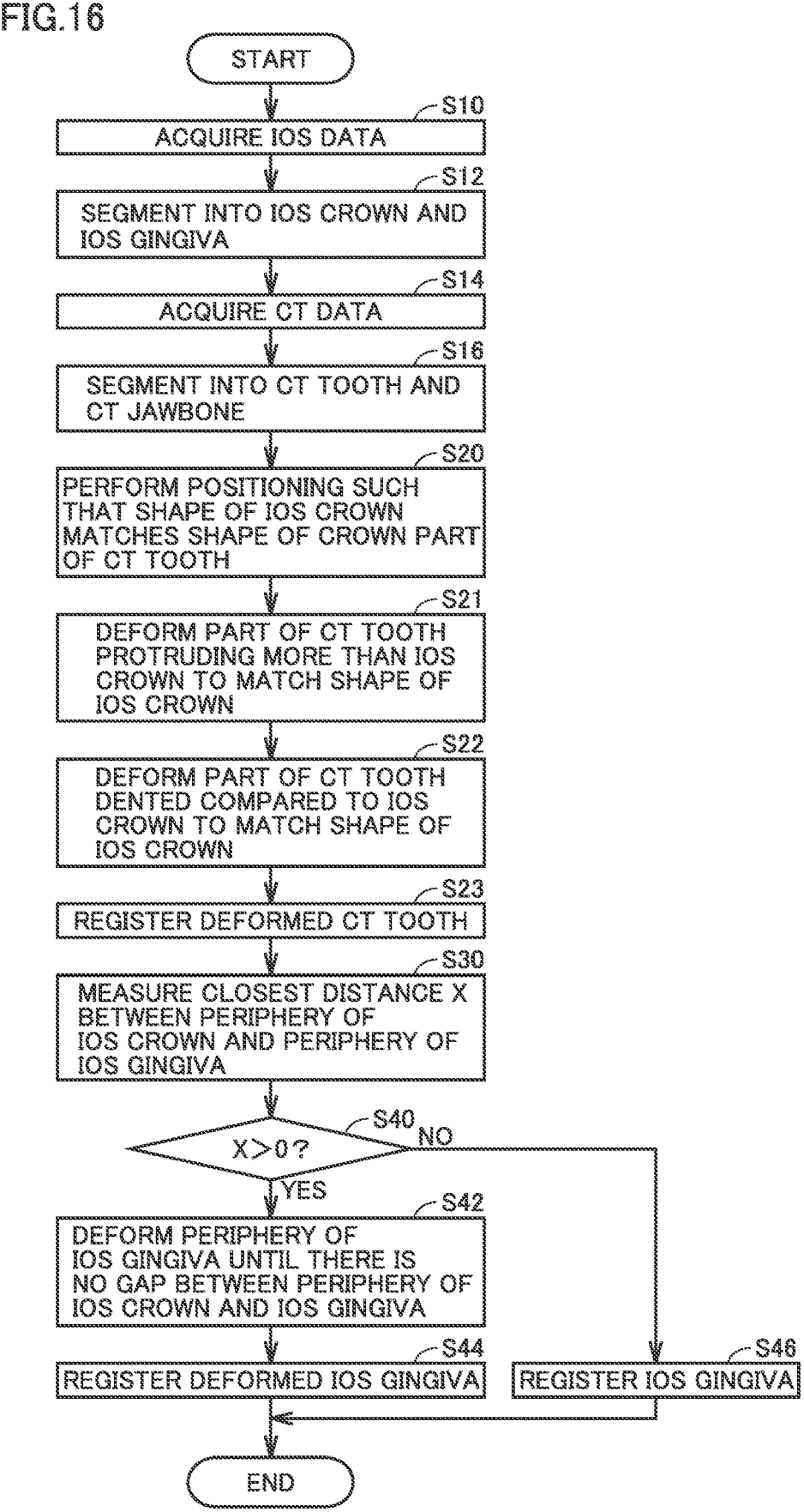
FIG. 16 is a flowchart (second) showing an example of the procedure by the arithmetic unit.

FIG. 16 is a flowchart showing an example of the procedure that is performed by arithmetic unit 11 according to the fourth modification at the time of synthesis of the IOS data and the CT data. Additionally, in the flowchart shown in FIG. 16, steps S21, S22, and S23 are added between step S20 and step S30 in the flowchart in FIG. 10 described above.

Arithmetic unit 11 compares the surface shape of the IOS crown after the positioning in step S20 with the surface shape of the CT tooth, and deforms surface shape data of a protruding part of the CT tooth that protrudes more than the IOS crown to match the surface shape of the IOS crown (step S21), and also, deforms surface shape data of a recessed part of the CT tooth that is dented compared to the IOS crown to match the surface shape of the IOS crown (step S22). Then, arithmetic unit 11 registers the data of the CT tooth after deformation (step S23).

The data of the IOS crown may be synthesized with the CT data in the above manner.

<Fifth Modification>

In the fourth modification described above, the IOS crown and the CT tooth are synthesized with each other by deforming the data of the CT tooth according to the IOS crown.

In contrast, in a fifth modification, the IOS crown and the CT tooth are synthesized with each other by coupling the data of the surface shape of the IOS crown and the data of the surface shape of the CT tooth.

Figure 17:
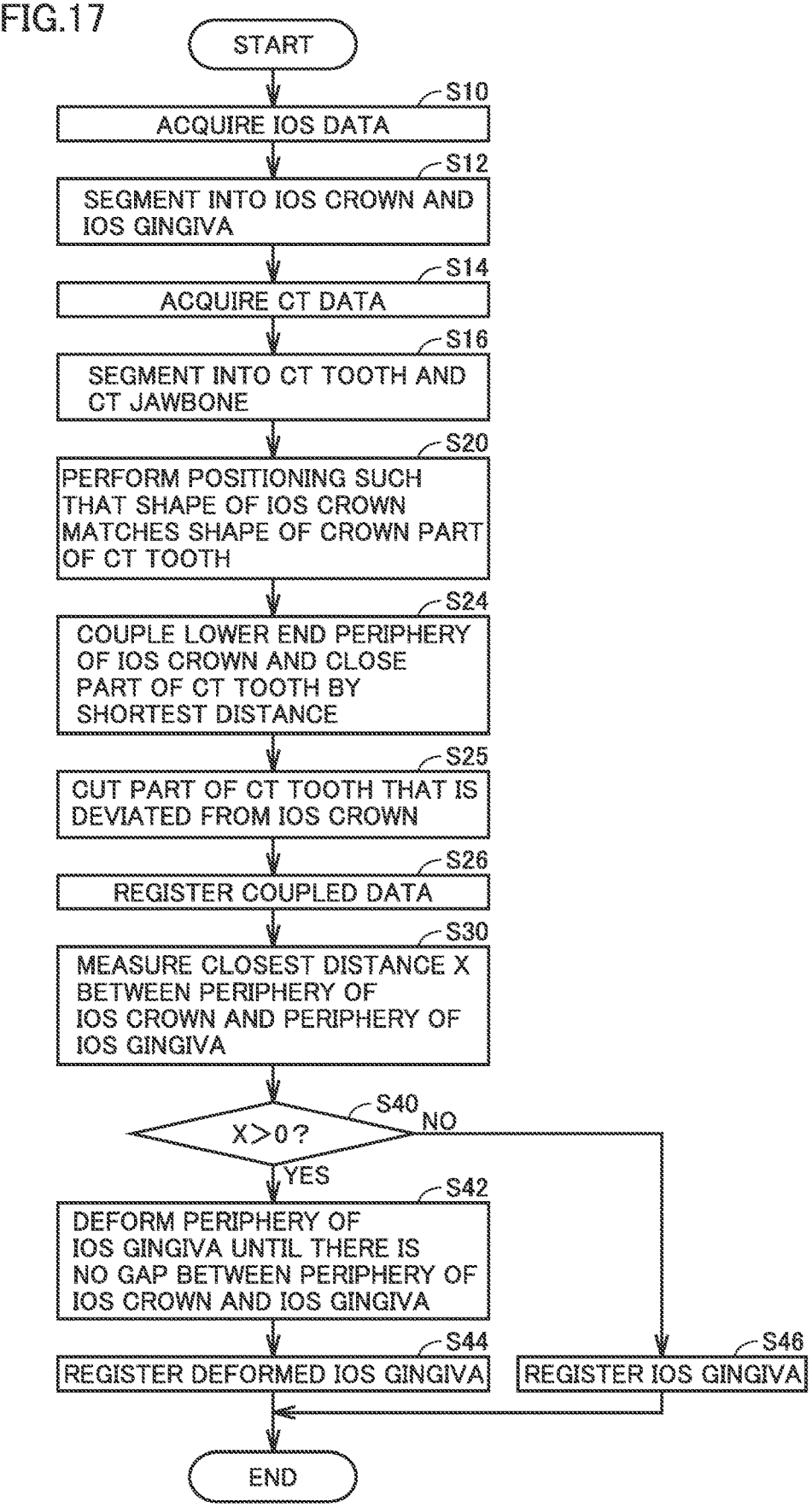
FIG. 17 is a flowchart (third) showing an example of the procedure by the arithmetic unit.

FIG. 17 is a flowchart showing an example of a procedure according to the fifth modification that is performed by arithmetic unit 11 at the time of synthesis of the IOS data and the CT data. Additionally, in the flowchart shown in FIG. 17, steps S21, S22, and S23 in FIG. 16 described above are changed to steps S24, S25, and S26, respectively.

Arithmetic unit 11 couples a lower end periphery of the IOS crown after the positioning in step S20 and a part of the CT tooth that is close to the lower end periphery of the IOS crown by a shortest distance (step S24).

Next, arithmetic unit 11 cuts (deletes) a part of a surface of the crown part of the CT tooth that is deviated from the IOS crown (step S25). Next, arithmetic unit 11 registers the coupled data (step S26).

FIG. 18 is a diagram for describing the synthesis method for IOS crown 21 and CT tooth 31 according to the fifth modification. At the time of coupling the data of the surface shape of IOS crown 21 and the data of the surface shape of CT tooth 31, arithmetic unit 11 according to the fifth modification first couples a lower end periphery 26 of IOS crown 21 and a part 36 of CT tooth 31 that is close to lower end periphery 26 of IOS crown 26 by a shortest distance. In the case of such coupling, the surface shape of IOS crown 21 and the surface shape of CT tooth 31 possibly do not match each other. Accordingly, arithmetic unit 11 cuts (deletes) a part of the surface of the crown part of CT tooth 31 that is deviated from IOS crown 21.

Figure 19:
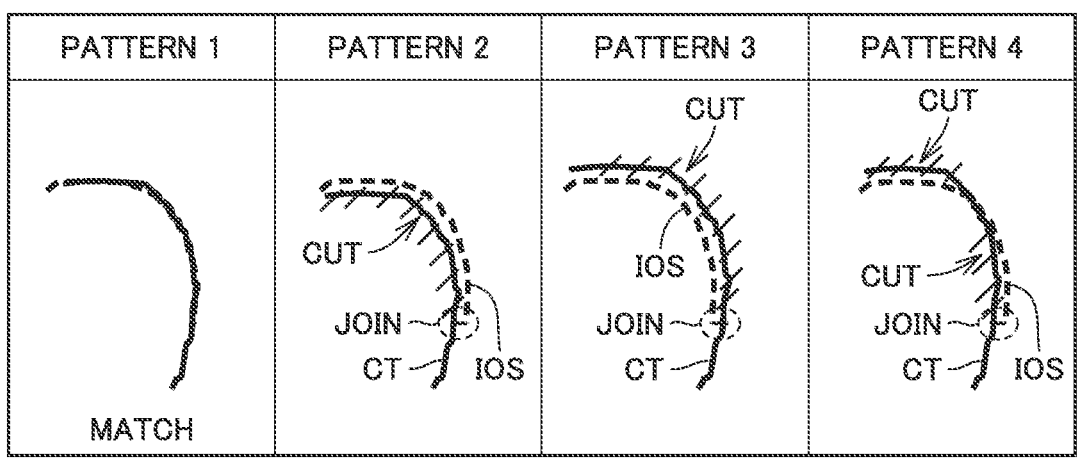
FIG. 19 is a diagram for describing a method of cutting a surface of the crown part of the CT tooth.

FIG. 19 is a diagram for describing an example of a method of cutting the surface of the crown part of CT tooth 31. With respect to a part where the surface shape of CT tooth 31 and the surface shape of IOS crown 21 match, IOS crown 21 can be used (pattern 1).

With respect to a part where CT tooth 31 is included within IOS crown 21, a lower end of IOS crown 21 is coupled to CT tooth 31 by a shortest distance, and also, a part of CT tooth 31 that is included within IOS crown 21 is cut (pattern 2).

With respect to a part where CT tooth 31 extends outside IOS crown 21, the lower end of IOS crown 21 is coupled to CT tooth 31 by a shortest distance, and also, a part of CT tooth 31 that extends outside IOS crown 21 is cut (pattern 3).

In the case where CT tooth 31 includes a part that is included within IOS crown 21 and a part that extends outside IOS crown 21, the lower end of IOS crown 21 is coupled to CT tooth 31 by a shortest distance, and also, the part of CT tooth 31 that is included within IOS crown 21 and the part of CT tooth 31 that extends outside IOS crown 21 are cut (pattern 4).

As described above, the IOS crown and the CT tooth may be synthesized with each other by coupling the data of the surface shape of the IOS crown and the data of the surface shape of the CT tooth.

The embodiments of the present disclosure have been described above, but the embodiments disclosed herein are illustrative in every aspect, and should be understood to be non-restrictive. The scope of the present disclosure is indicated by the scope of the claims, and is intended to include all the modifications within the scope and meaning equivalent to those of the scope of the claims.

What is claimed is:

1. A data processing apparatus for processing three-dimensional data, the data processing apparatus comprising:
an input portion configured to receive at least first data and second data as an input, the first data being obtained by performing scanning by a scanner that is inserted inside a mouth of a target person and including coordinate data of a point group indicating a surface shape of a tooth row including a first crown and gingiva, the second data being obtained by capturing at least the tooth row inside the mouth of the target person by an X-ray imaging device and including volume data of a second crown; and
processing circuitry configured to convert the first data and the second data into a common data format, and synthesize the first data and the second data after conversion with each other, wherein the processing circuitry replaces, in the second data, the second crown included in the second data, with which a shape of the first crown matches, with the first crown included in the first data, and performs synthesis in such a way that the gingiva is arranged near the first crown after replacement, and wherein the coordinate data of the point group of the first crown and the volume data of the second crown refer to the same tooth in the tooth row.

2. The data processing apparatus according to claim 1, wherein, at a time of synthesizing the first data and the second data with each other, the processing circuitry corrects data of the gingiva in such a way as to interpolate a gap that is created by replacement related to the first crown.

3. The data processing apparatus according to claim 2, wherein, at the time of synthesizing the first data and the second data with each other, the processing circuitry performs segmentation with respect to the first crown and the gingiva that are included in the first data, performs replacement in relation to the first crown such that a surface shape of the first crown after segmentation matches a surface shape of the second crown, and corrects data of a part of the gingiva that faces the first crown such that a gap between the first crown and the gingiva that is created by replacement related to the first crown is interpolated.

4. The data processing apparatus according to claim 2, wherein, at the time of synthesizing the first data and the second data with each other, the processing circuitry performs segmentation with respect to the first crown, an adjacent portion of the gingiva that is adjacent to the first crown, and a non-adjacent portion of the gingiva that is not adjacent to the first crown, the first crown, the adjacent portion, and the non-adjacent portion being included in the first data, performs replacement in relation to a set of the first crown and the adjacent portion of the gingiva such that a surface shape of the first crown after segmentation matches a surface shape of the second crown, and corrects data of at least one of the adjacent portion and the non-adjacent portion of the gingiva such that a gap between the adjacent portion and the non-adjacent portion of the gingiva, the gap being created by replacement related to the set, is interpolated.

5. The data processing apparatus according to claim 2, wherein the first data includes data of a plurality of first crowns that are aligned in a tooth row direction, the second data includes data of a plurality of second crowns that are aligned in the tooth row direction, and at the time of synthesizing the first data and the second data with each other, the processing circuitry performs segmentation with respect to the plurality of first crowns and the gingiva that are included in the first data, and further segments the gingiva into a plurality of divided portions that are adjacent to the plurality of first crowns, respectively, performs replacement in relation to a set of each of the plurality of first crowns and each of the plurality of divided portions of the gingiva that is adjacent to each of the plurality of first crowns such that a surface shape of each of the plurality of first crowns after segmentation matches a surface shape of the second crown corresponding to each of the plurality of first crowns, and corrects data of the plurality of divided portions of the gingiva such that a gap between the plurality of divided portions of the gingiva that are adjacent to each other in the tooth row direction is interpolated, the gap being created by replacement related to the set.

6. The data processing apparatus according to claim 1, wherein the processing circuitry performs a simulation process of moving a tooth included in data obtained by synthesizing the first data and the second data with each other to a desired position, and corrects data of the gingiva such that a gap between the tooth and the gingiva, the gap being created by the simulation process, is interpolated.

7. The data processing apparatus according to claim 1, wherein the processing circuitry synthesizes data of the first crown after replacement with the second data, in addition to data of the gingiva.

8. The data processing apparatus according to claim 7, wherein, at a time of synthesizing the data of the first crown after replacement with the second data, the processing circuitry cuts a part, on a surface of the second crown, that is deviated from the first crown after replacement.

9. The data processing apparatus according to claim 1, wherein, at a time of synthesizing the first data and the second data with each other, the processing circuitry performs at least one of a process of segmenting a tooth included in the first data, and a process of segmenting a tooth included in the second data.

10. A data processing method for processing three-dimensional data, the data processing method comprising:

receiving at least first data and second data, the first data being obtained by performing scanning by a scanner that is inserted inside a mouth of a target person and including coordinate data of a point group indicating a surface shape of a tooth row including a first crown and gingiva, the second data being obtained by capturing at least the tooth row inside the mouth of the target person by an X-ray imaging device and including volume data of a second crown, wherein the coordinate data of the point group of the first crown and the volume data of the second crown refer to the same tooth in the tooth row; and converting the first data and the second data into a common data format, and synthesizing the first data and the second data after conversion with each other, wherein the synthesizing the first data and the second data includes, in relation to the second data, replacing the second crown included in the second data, with which a shape of the first crown matches, with the first crown included in the first data, and performing synthesis in such a way that the gingiva is arranged near the first crown after replacement.

11. The data processing method according to claim 10, further comprising, at a time of synthesizing the first data and the second data with each other, correcting data of the gingiva in such a way as to interpolate a gap that is created by replacement related to the first crown.

12. The data processing method according to claim 11, further comprising, at the time of synthesizing the first data and the second data with each other, performing segmentation with respect to the first crown and the gingiva that are included in the first data, performing replacement in relation to the first crown such that a surface shape of the first crown after segmentation matches a surface shape of the second crown, and correcting data of a part of the gingiva that faces the first crown such that a gap between the first crown and the gingiva that is created by replacement related to the first crown is interpolated.

13. The data processing method according to claim 11, further comprising, at the time of synthesizing the first data and the second data with each other,
- performing segmentation with respect to the first crown, an adjacent portion of the gingiva that is adjacent to the first crown, and a non-adjacent portion of the gingiva that is not adjacent to the first crown, the first crown, the adjacent portion, and the non-adjacent portion being included in the first data,
- performing replacement in relation to a set of the first crown and the adjacent portion of the gingiva such that a surface shape of the first crown after segmentation matches a surface shape of the second crown, and
- correcting data of at least one of the adjacent portion and the non-adjacent portion of the gingiva such that a gap between the adjacent portion and the non-adjacent portion of the gingiva, the gap being created by replacement related to the set, is interpolated.

14. The data processing method according to claim 11, wherein
- the first data includes data of a plurality of first crowns that are aligned in a tooth row direction,
- the second data includes data of a plurality of second crowns that are aligned in the tooth row direction, and further comprising,
- at the time of synthesizing the first data and the second data with each other,
- performing segmentation with respect to the plurality of first crowns and the gingiva that are included in the first data, and further segmenting the gingiva into divided portions that are adjacent to the plurality of first crowns, respectively,
- performing replacement in relation to a set of each of the plurality of first crowns and each of the plurality of divided portions of the gingiva that is adjacent to each of the plurality of first crowns such that a surface shape of each of the plurality of first crowns after segmentation matches a surface shape of the second crown corresponding to each of the plurality of first crowns, and
- correcting data of the plurality of divided portions of the gingiva such that a gap between the plurality of divided portions of the gingiva that are adjacent to each other in the tooth row direction is interpolated, the gap being created by replacement related to the set.

15. The data processing method according to claim 10, further comprising
- performing a simulation process of moving a tooth included in data obtained by synthesizing the first data and the second data with each other to a desired position, and
- correcting data of the gingiva such that a gap between the tooth and the gingiva, the gap being created by the simulation process, is interpolated.

16. The data processing method according to claim 10, further comprising synthesizing data of the first crown after replacement with the second data, in addition to data of the gingiva.

17. The data processing method according to claim 16, further comprising, at a time of synthesizing the data of the first crown after replacement with the second data, cutting a part, on a surface of the second crown, that is deviated from the first crown after replacement.

18. The data processing method according to claim 10, further comprising, at a time of synthesizing the first data and the second data with each other, segmenting at least one of a tooth included in the first data and a tooth included in the second data.

19. A non-transitory computer-readable storage medium for storing computer-readable instructions that, when executed by a computer, cause the computer to perform a method, the method comprising:
- receiving at least first data and second data, the first data being obtained by performing scanning by a scanner that is inserted inside a mouth of a target person and including coordinate data of a point group indicating a surface shape of a tooth row including a first crown and gingiva, the second data being obtained by capturing at least the tooth row inside the mouth of the target person by an X-ray imaging device and including volume data of a second crown, wherein the coordinate data of the point group of the first crown and the volume data of the second crown refer to the same tooth in the tooth row; and
- converting the first data and the second data into a common data format, and synthesizing the first data and the second data after conversion with each other, wherein
- the synthesizing the first data and the second data includes, in relation to the second data,
- replacing the second crown included in the second data, with which a shape of the first crown matches, with the first crown included in the first data, and
- performing synthesis in such a way that the gingiva is arranged near the first crown after replacement.

20. The non-transitory computer-readable storage medium of claim 19, further comprising, at a time of synthesizing the first data and the second data with each other, correcting data of the gingiva in such a way as to interpolate a gap that is created by replacement related to the first crown.

* * * * *